US007526921B2

(12) United States Patent
Williams et al.

(10) Patent No.: US 7,526,921 B2
(45) Date of Patent: May 5, 2009

(54) AUXILIARY POWER UNIT WITH INTEGRAL FIREBOX

(75) Inventors: Nicholas A. Williams, Phoenix, AZ (US); Kevin S. Dittmar, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 589 days.

(21) Appl. No.: 11/225,556

(22) Filed: Sep. 12, 2005

(65) Prior Publication Data

US 2006/0218934 A1    Oct. 5, 2006

Related U.S. Application Data

(60) Provisional application No. 60/666,067, filed on Mar. 29, 2005.

(51) Int. Cl.
*F02C 7/20* (2006.01)
(52) U.S. Cl. .............................. 60/796; 60/797; 60/801; 244/54
(58) Field of Classification Search .................. 60/785, 60/801, 802, 796, 797
See application file for complete search history.

(56) References Cited

U.S. PATENT DOCUMENTS

| | | | |
|---|---|---|---|
| 2,277,294 A | 3/1942 | Brooks | |
| 3,748,111 A | 7/1973 | Klose | |
| 4,043,522 A | 8/1977 | Vetter | |
| 4,113,054 A * | 9/1978 | Myers | 182/2.9 |
| 4,130,258 A | 12/1978 | Fox | |
| 4,150,540 A * | 4/1979 | Krayenbuhl et al. | 60/770 |
| 4,909,730 A | 3/1990 | Roussakis et al. | |
| 4,918,917 A * | 4/1990 | Woods | 60/320 |
| 4,964,882 A | 10/1990 | Gaul | |
| 5,160,069 A * | 11/1992 | Klaass et al. | 60/776 |
| 5,415,233 A | 5/1995 | Roussakis et al. | |
| 5,505,423 A | 4/1996 | Kusijanovic | |
| 5,816,333 A | 10/1998 | Audic et al. | |
| 5,840,798 A * | 11/1998 | Vollenberg et al. | 524/423 |
| 5,910,094 A * | 6/1999 | Kraft et al. | 60/39.091 |
| 5,921,500 A | 7/1999 | Ellis et al. | |
| 6,059,227 A | 5/2000 | Le Blaye et al. | |
| 6,272,838 B1 * | 8/2001 | Harvell et al. | 60/783 |
| 6,308,915 B1 | 10/2001 | Liston et al. | |
| 6,474,596 B1 | 11/2002 | Cousin et al. | |
| 6,581,874 B2 | 6/2003 | Lemire et al. | |
| 6,644,961 B2 | 11/2003 | Brooker | |
| 6,851,267 B2 | 2/2005 | Bruno et al. | |
| 2004/0118128 A1 * | 6/2004 | Bruno et al. | 60/801 |

* cited by examiner

*Primary Examiner*—Michael Cuff
*Assistant Examiner*—Phutthiwat Wongwian
(74) *Attorney, Agent, or Firm*—Ingrassia Fisher & Lorenz, P.C.

(57) ABSTRACT

An auxiliary power unit (APU) with integral firebox provides an integral unit for aircraft to utilize an APU without the use of a separate firebox. The present invention comprises a turbomachine intake air duct secured to an enclosure, the enclosure having a bleed air port extending from the combustor to outside of the enclosure, with an APU secured therein. The APU can be retrofitted to existing aircraft, or installed in newly-built aircraft.

13 Claims, 6 Drawing Sheets

AUXILIARY POWER UNIT WITH INTEGRAL FIREBOX

CROSS REFERENCE TO RELATED APPLICATIONS

This patent application claims the benefit of U.S. Provisional Patent Application No. 60/666,067, filed Mar. 29, 2005.

BACKGROUND OF THE INVENTION

The present invention relates generally to an auxiliary power unit (APU) having an integral firebox. More particularly this invention relates to an auxiliary power unit that can be retrofitted, installed, or removed as a single unit.

Many modern commercial and business aircraft are equipped with airborne auxiliary power units (APUs). The APU provides electrical and pneumatic power to the aircraft for such tasks as environmental control, lighting, powering electronics, main engine starting, etc. Because of the size and weight of an APU, smaller aircraft have not been able to take advantage of the benefits and convenience of an airborne APU.

Two aspects of an airborne APU installation, which are typically high in development and certification costs, are (1) the need for a redundant or damage tolerant mount systems, and (2) the need for a dedicated fire zone within the aircraft for the APU. To address the need for a redundant or damage tolerant mount system, airborne APU installations typically utilize a complex network of struts or links and/or extensive and costly stress analyses. Complying with fire zone requirements is usually accomplished by dedicating a fireproof zone for the APU installation in the aircraft. Alternatively, some aircraft manufacturers choose to install the APU in the aircraft within a fireproof enclosure, which may make the installation relatively complex and heavy, when compared with the airborne APU that is fully integrated with the aircraft.

U.S. Pat. No. 6,308,915 discloses an "integral tailcone and power assembly." This patent discloses a tailcone and power assembly mountable to the body of an aircraft using a height adjustable dolly. In the '915 patent the auxiliary power assembly is bolted to the aircraft. The '915 patent does not disclose an APU with an integral firebox that is structurally created as a single integral unit. FIG. 3 of the '915 patent shows a firewall 17 that separates the turbine engine from the fuselage. The '915 patent does not disclose an enclosure and turbomachine air intake duct structurally combined and secured to the APU to form an integral unit with the APU.

U.S. Pat. No. 6,581,874 discloses a "mounting assembly for an aircraft auxiliary power unit and method." The '874 patent discloses a suspension system to support an APU within a tailcone section for removal and installation of the APU. Further, the '874 patent does not disclose an integral firebox. FIG. 6 of the '874 patent discloses rails and beams 50 to mount a generator 34 to the plane. The '874 patent does not disclose a firebox or firewall.

Therefore, there is a need to incorporate into the design of the general aircraft a redundant/damage tolerant mount system and an integral fireproof enclosure for an APU, referred to herein as an enclosure. There is a need to reduce the development costs associated with the mount system and the enclosure, as well as a need to reduce the weight of the enclosure. Further, there is a need to create an affordable means to utilize APU's with small aircraft. Additionally, there is a need to retrofit existing aircraft with APUs having an integral firebox.

SUMMARY OF THE INVENTION

According to one aspect of the present invention, an auxiliary power unit, comprising a firebox secured to the auxiliary power unit; the firebox having a turbomachine air intake duct, said turbomachine air intake duct being a cylindrical duct and having an intake end and an aft end; and the firebox also having an enclosure secured to an aft end of said turbomachine air intake duct.

According to another aspect of the present invention, an auxiliary power unit and integral firebox, comprising: a turbomachine air intake duct, the turbomachine air intake duct having an intake end and an aft end; a fireproof enclosure secured to an aft end of said turbomachine air intake duct; and a bleed port having an inlet end connected to a turbomachine bleed air supply, said bleed port extending from said inlet end through said enclosure to an outlet.

According to yet another aspect of the present invention, an auxiliary power unit, comprising a firebox secured to a turbomachine air intake duct, said turbomachine air intake duct having an intake end and an aft end; the firebox having an enclosure secured to an aft end of said turbomachine air intake duct via a mounting system, said mounting system secured to a turbomachine; and the firebox having a bleed port having an inlet end connected to a turbomachine bleed air supply, said bleed port extending from said inlet end through said enclosure to an outlet.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides apparatus and methods for auxiliary power units ("APU") to be utilized with the general aviation market. The general aviation market to which this invention relates typically includes small noncommercial and nonmilitary aircraft usually containing two to four seats and other similarly sized aircraft.

The present invention discloses an enclosure and turbomachine air intake duct structurally combined and secured to the APU to form an integral unit with the APU.

References to upstream, forward, front, etc. found herein generally refer to the intake side. References to downstream, aft, back, etc. generally refer to the exhaust side. Such references are made for convenience of comprehension and should not be taken in a limiting sense, as each application of the present invention within an aircraft may be unique.

Figure 1:
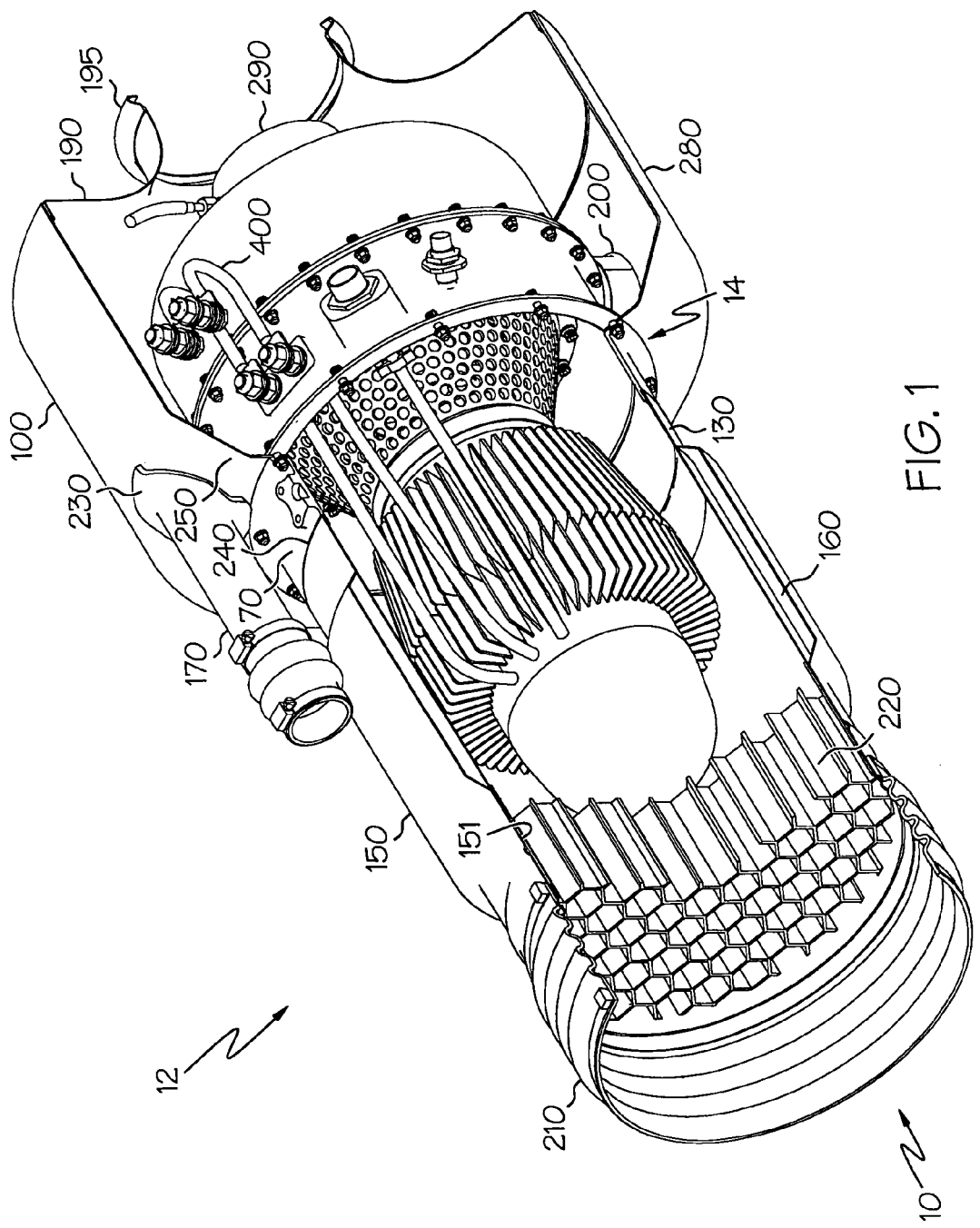
FIG. 1 is a pictorial cut-away view of an integral firebox with an APU installed in the firebox according to an embodiment of the present invention.
Figure 2:
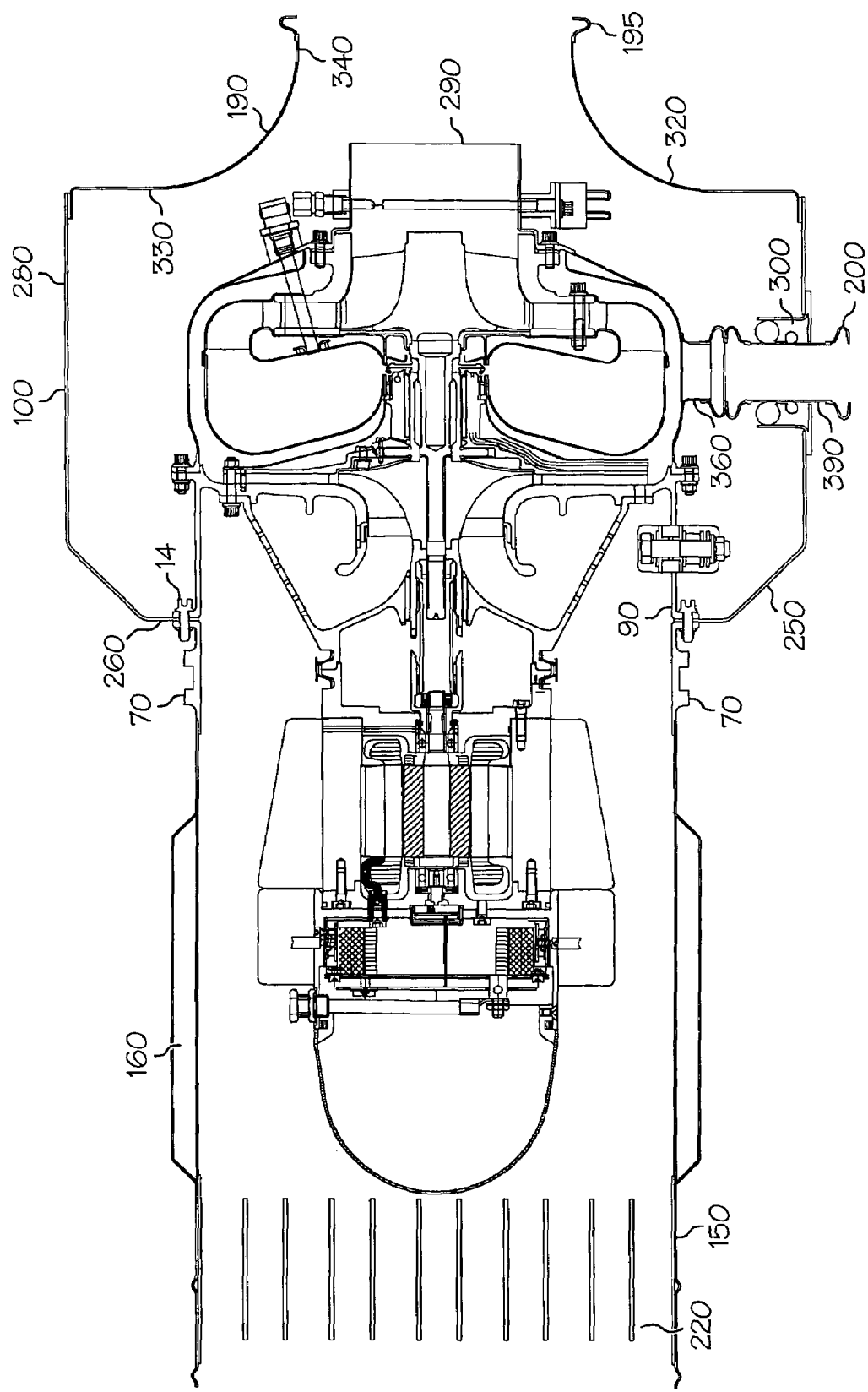
FIG. 2 is a pictorial cross sectional view of the integral firebox with the APU installed in the firebox according to an embodiment of the present invention.

FIGS. 1 and 2 illustrate an exemplary embodiment of an auxiliary power unit (APU) with an integral firebox 10. Generally, the firebox 12 of the present invention comprises a turbomachine air intake duct 150 and an enclosure 100. These components combined with the APU, comprise the APU with an integral firebox 10.

A turbomachine air intake duct 150 may be disposed concentrically surrounding a turbomachine 16. Downstream from an inlet end 155 of the turbomachine air intake duct 150, the turbomachine air intake duct 150 may be secured to an enclosure 100, via a mounting system 70.

Figure 3:
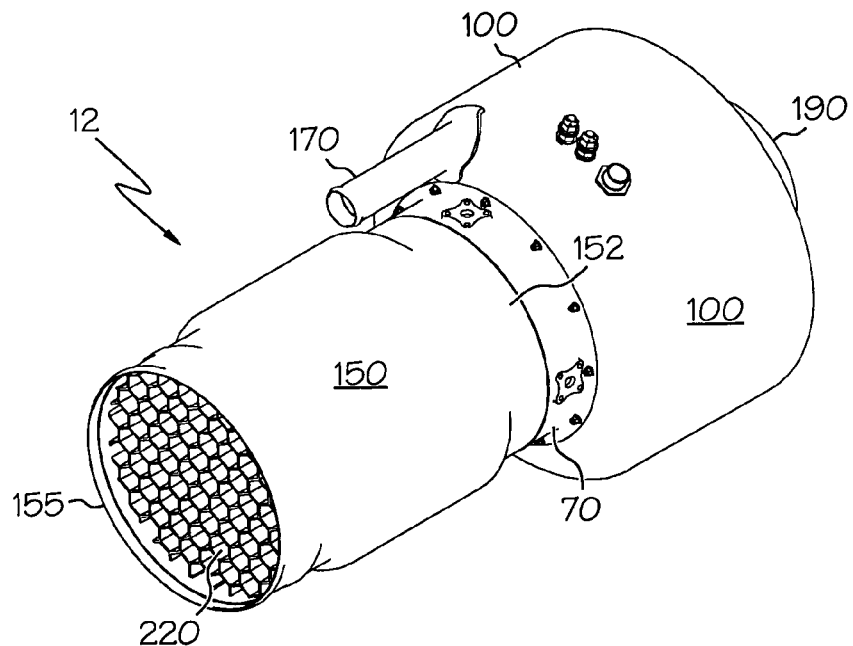
FIG. 3 is a perspective view of the auxiliary power unit with integral firebox, according to an embodiment of the present invention.

Referring to FIG. 3, the firebox 12 may comprise a turbomachine air intake duct 150 that may have an inlet end 155 and an aft end 152, also referred to herein as a distal axial end 152. The firebox also comprises the enclosure 100, which may be secured to the aft end or distal axial end 152 of the turbomachine air intake duct 150. An exhaust bellmouth 190 may be disposed at the distal axial end 102 of the enclosure 100.

Figure 4:
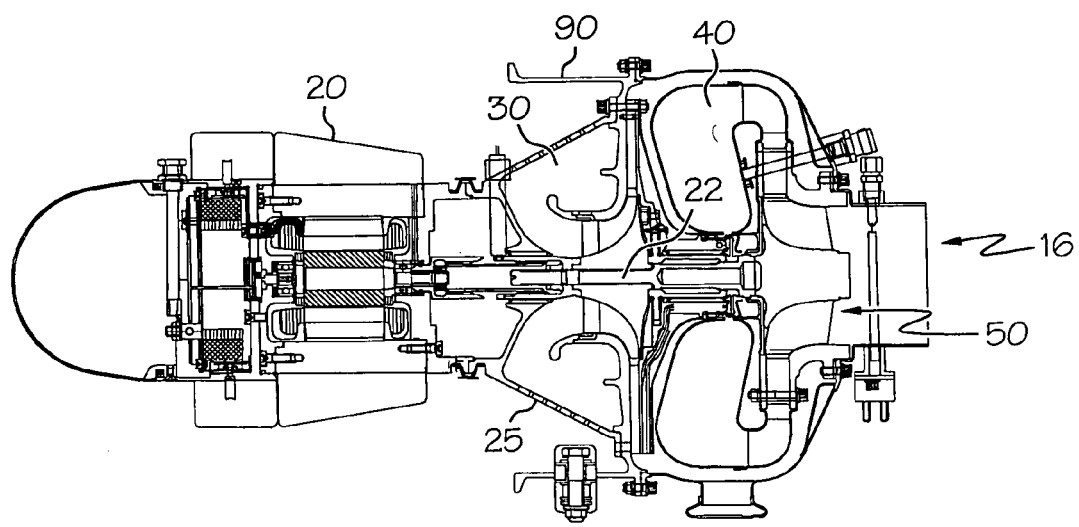
FIG. 4 is a cross section of the auxiliary power unit of the present invention.

As illustrated in FIG. 4, the present invention consists of a starter-generator unit 20, a compressor 30, a combustor 40, and a turbine 50. The turbine 50 may have an output shaft 22 on which a compressor 30 may be mounted, and the starter-generator unit 20 coupled to the turbine output shaft 22. Air may enter the turbomachine 16 through an inlet screen 25 downstream of the starter-generator unit 20 where it may be compressed by the compressor wheel. A portion of the air may be extracted downstream of the compressor 30 for pneumatic power. The remainder of the compressed air may then enter the combustor 40 where it can be mixed with fuel and ignited. The combustion gases may then be forced over the turbine wheel where work may be extracted. The work can be used to compress air in the compressor 30 and generate electrical power in the starter-generator unit 20. After work is extracted from the combustion gases, they may be discharged from the turbomachine 16 via an exhaust nozzle 290.

As illustrated in FIG. 4, proximate an inlet screen 25, is a turbomachine flange 90, which may be used to support the turbomachine 16. Further details regarding the turbomachine 16 for use in the present invention can be found in U.S. patent application Ser. No. 10/880,820 (Dittmar et al.) the disclosure of which is incorporated herein by reference in its entirety. Any of the turbomachines described therein may be suitable for use in conjunction with the present invention.

Figure 5:
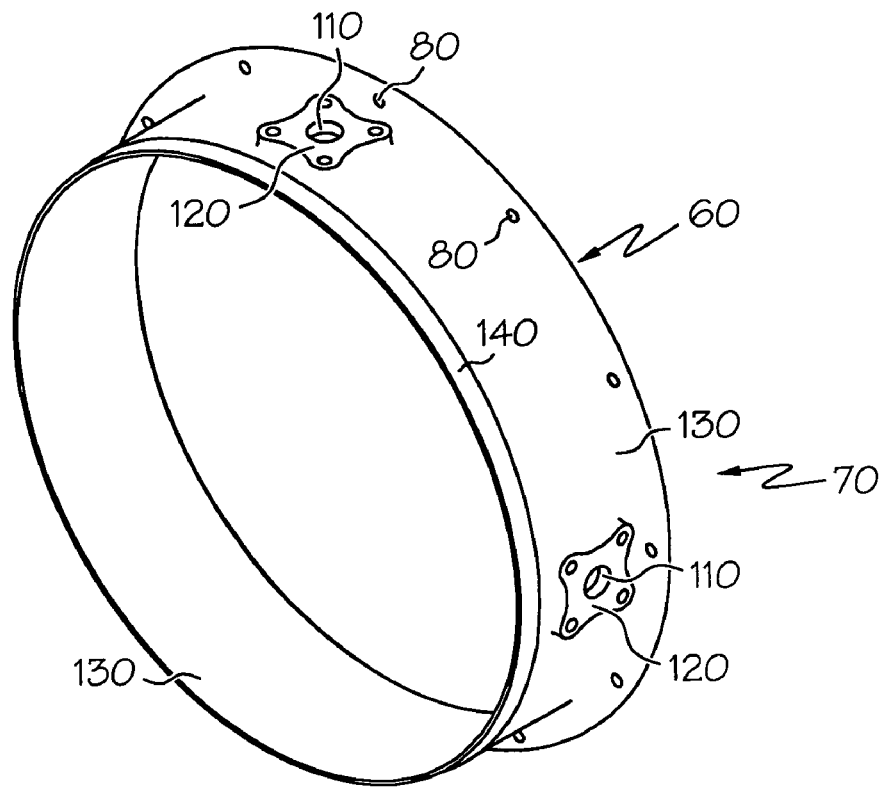
FIG. 5 is a perspective view of the mount system used in the present invention.

As illustrated in FIG. 5, the mount system flange 60 may contain mount system bolt apertures 80 that may be aligned in a pattern designed to interface with a turbomachine flange 90, and the enclosure 100. To form a fireproof interface, gaskets (not illustrated) can be used between the constituent components of any respective joint (not illustrated). Alternatively, the pitch of the bolt pattern can be designed to form a fireproof joint. Guidance on pitch values can be found in Federal Aviation Administration Advisory Circular 20-135. Additionally, pitch values, which have been verified as fireproof through testing, can also be used.

Figure 6:
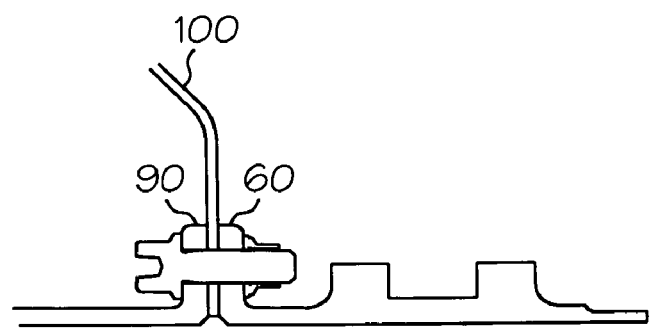
FIG. 6 is a cross section of a joint between the mount system, a turbomachine, and an enclosure of the present invention.
Figure 7:
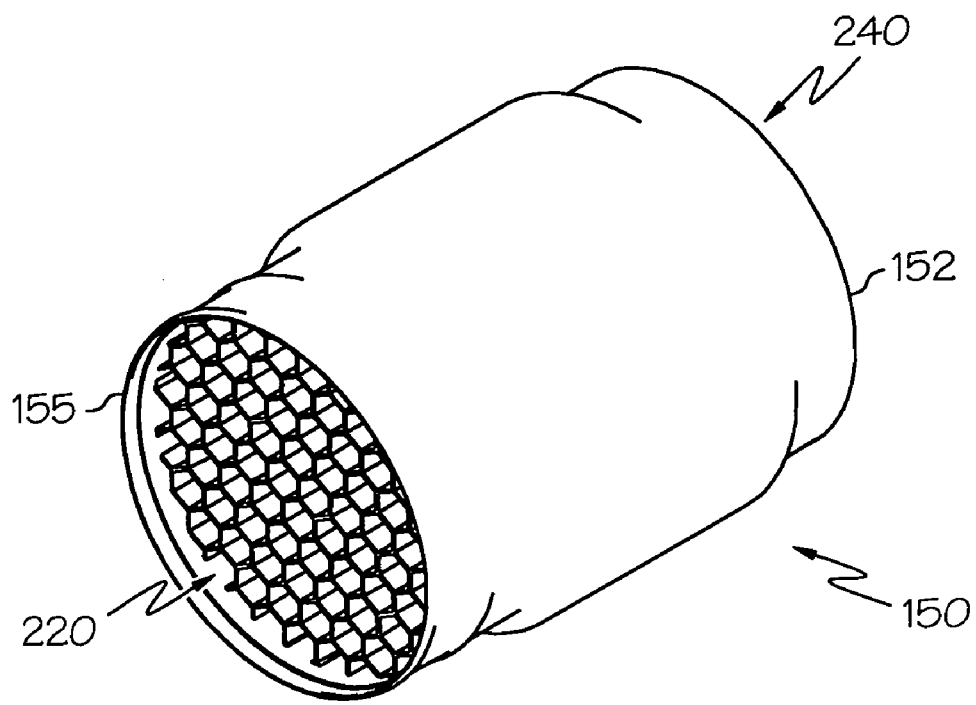
FIG. 7 is a pictorial view of a turbomachine air intake duct of the present invention.

As illustrated in FIGS. 5 and 6, a mount pad 120 may be disposed circumferentially about the outer surface of the cylinder 130. In one exemplary embodiment, three (3) or more mount pads 120 may be used. The mount pads 120 may be typical of those known in the art, and may consist of a cloverleaf configuration of a four bolt pattern to receive threaded fasteners, and a single bearing hole 110 disposed centrally therein to receive a stud adapter (not shown). FIG. 5 illustrates a step 140 disposed on the outer surface of the cylinder 130. The step 140 may securely mate with the distal axial end 152 of a turbomachine air intake duct 150 (FIG. 7). A height of the step 140 may be sized from the thickness of the turbomachine air intake duct 150, and the length of the step 140 may be sized to provide adequate support for the interface with the turbomachine air intake duct 150. By providing multiple load paths into the turbomachine 16 and several mount pads 120 disposed about the mount system 70, an operator can very easily provide the required redundant and/or damage tolerant mount system 70 in individual applications.

The firebox 12 may consist of several components disposed around the turbomachine 16 on either side of the mount system 70. These components may include: a turbomachine air intake duct 150 and a cooling air intake duct 170. Each of the turbomachine air intake duct 150 and the cooling air intake duct 170 may have integral flame arrestors. A turbomachine air intake duct flame arrestor 220 is illustrated in FIGS. 1 and 2.

The turbomachine air intake duct 150, which is shown in FIG. 7 may comprise a cylindrical duct of three sections, all of which may be integrally formed into a single fiber reinforced plastic composite ("FRPC"), such as graphite-bismaleimide ("GR/BMI"). The inside diameter of the distal axial end 152 of the turbomachine air intake duct 150 may match the outside diameter of the step 140 of the mount system 70. The turbomachine air intake duct 150 may be attached to the mount system 70 via fixed or removable fasteners to define an interface 240 (FIG. 1). In one exemplary embodiment, a fireproof sealant (not shown) can be used between the mount system 70 and the turbomachine air intake duct 150. Immediately adjacent to the interface 240 with the mount system 70 may be a section of the turbomachine air intake duct 150 that may incorporate an acoustic treatment 160 to attenuate noise generated by the turbomachine 16. The acoustic treatment 160 may be common in the art and typically may include a honeycomb material disposed about the flow surface of an inlet and covered with an acoustically permeable facesheet. Examples of such treatments, which can be readily adapted for use in the present invention, can be found in U.S. Pat. No. 3,948,346 (Schindler) and U.S. Pat. No. 5,782,082 (Hogeboom), the disclosure of each of which is incorporated herein by reference.

As illustrated in FIG. 1, adjacent to the acoustic treatment section 160, axially opposite the interface 240 with the mount system 70, the turbomachine air intake duct 150 may be configured on its outer surface 151 with a tube bead to mate with an air intake duct flexible boot 210, and on its inner surface to mate with an air intake flame arrestor 220.

The usage of the air intake flame arrestor 220 is optional. Whether to use an air intake flame arrestor 220 may depend on the size of the turbomachine 16. The unique size of the present invention APU with integral firebox 10 may result in a L/D (length to diameter ratio) in its air intake design which may not inhibit flame propagation out of the turbomachine 16 and into the compartment in which it is installed, thus necessitating use of the flame arrestor 220. The design and manufacture of flame arrestors is known in the art. U.S. Pat. No. 3,748,111 (Klose), U.S. Pat. No. 4,964,882 (Gaul), and U.S. Pat. No. 5,415,233 (Roussakis et al.), the disclosure of each of which is (incorporated herein by reference) provide flame arrestor design configurations and manufacturing methods which can be readily adapted to the present invention.

The securement or installation of the air intake flame arrestor 220 may be best accomplished by providing sufficient material thickness in the air intake duct 150 to accommodate fasteners, which can be installed through the turbomachine air intake duct 150 wall into the air intake flame arrestor 220. The air intake flame arrestor 220 may be installed downstream of the interface with the air intake duct flexible boot 210. A rationale for such a twofold configuration is to allow operators to utilize either the air intake flame arrestor 220, or to include an air intake duct flexible boot 210 in a particular application. The air intake duct flexible boot 210 may be fireproof. Use of a fireproof flexible boot 210 (and possibly fireproof ductwork (not shown) upstream of the air intake duct flexible boot 210) may increase the aspect ratio of the turbomachine induction system (not shown) and may eliminate the need for the air intake flame arrestor 220 altogether, or may allow use of a smaller lower weight flame arrestor.

Figure 8:
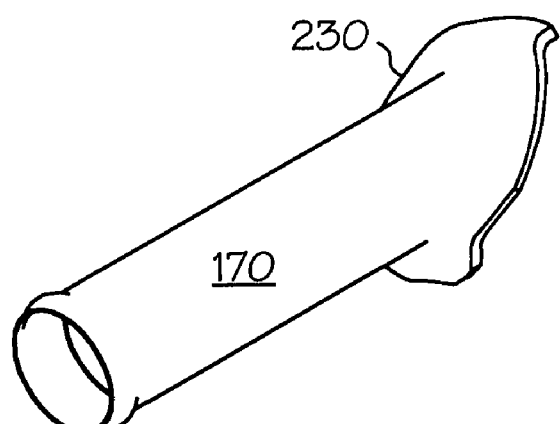
FIG. 8 is a pictorial view of a cooling air intake duct of the present invention.

FIG. 8 illustrates the cooling air intake duct 170, which may be a short small diameter duct with a cooling air intake duct flange 230 for attachment to the enclosure 100. The cooling air intake duct 170 may have a configuration similar to the turbomachine air intake duct 150 with respect to a flexible boot (not shown) and a flame arrestor (not shown). In a further exemplary embodiment of the present invention, an inside diameter mounted forced air fan (not shown) can also be included in the cooling air intake duct 170 to increase cooling airflow for the turbomachine 16. Such a fan may be necessitated when the in-line flame arrestor is used in the compartment cooling inlet because of the increased pressure drop and associated reduced eductor performance. The cooling air intake duct 170 can be located at any position about the circumference of the enclosure 100.

Like the turbomachine air intake duct 150, upstream ductwork of the cooling air intake duct 170 of a fireproof nature can be used to increase the aspect ratio and reduce the size of the flame arrestor (not shown) required, or eliminate the need for the flame arrestor (not shown) altogether. The enclosure 100 may be secured to the turbomachine flange 90 at the turbomachine interface 14 via an enclosure flange 260. A forward wall 250 (FIGS. 1 and 2) may extend radially outward from the enclosure flange 260 to a diameter large enough to encompass the turbomachine 16.

Figure 9:
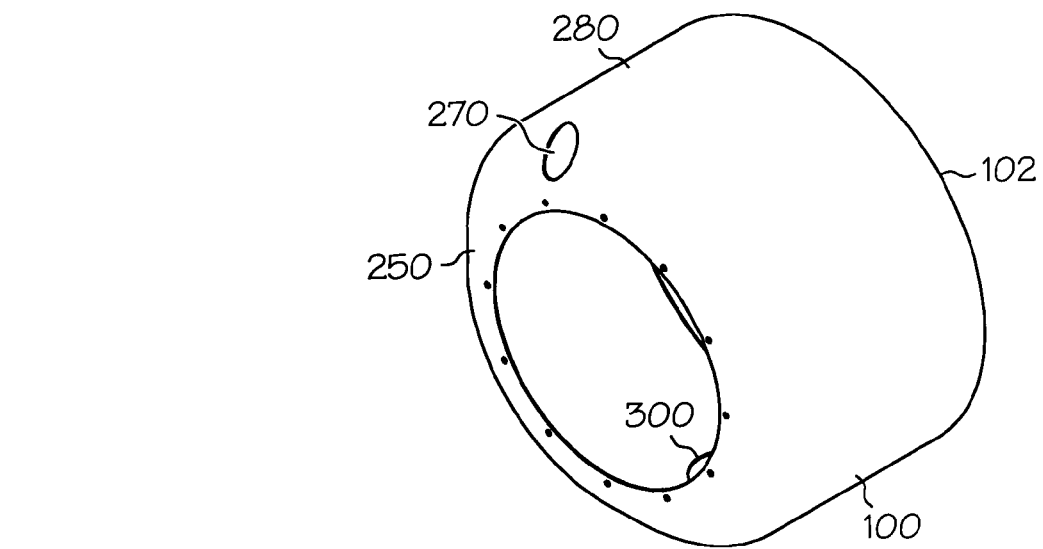
FIG. 9 is a pictorial view of an enclosure of the present invention.

Referring to FIG. 9, a cutout 270 may be included in the forward wall 250 where the cooling air intake duct 170 can be attached to allow the cooling air into the enclosure 100. The joint between the forward wall 250 of the enclosure 100, the mount system 70, and the turbomachine 16 is further shown in FIG. 2 and in greater detail in FIG. 6. The enclosure axial wall 280 may extend longitudinally from the forward wall 250 in a direction opposite the turbomachine air intake duct 150 and can terminate at a longitudinal point proximate the turbomachine exhaust nozzle 290.

The enclosure axial wall 280 may have a bleed port aperture 300 proximate the turbomachine's bleed air takeoff point 360 to interface with the bleed air port 200. An inner surface (not shown) of the enclosure 100 may provide a structural backing for a thermal barrier (not shown) that may be constructed of a powder-filament mixture of amorphous silica, metal oxides, and glass filaments. One suitable thermal barrier may be produced by Microtherm International Limited of Wirral, United Kingdom, which manufactures suitable insulations under the trade name MICROTHERM™. The inner surfaces of the thermal barrier can be covered in a protective foil or glass fiber cloth, which may be attached to the enclosure 100 through the thermal barrier with fixed fasteners.

Figure 10:
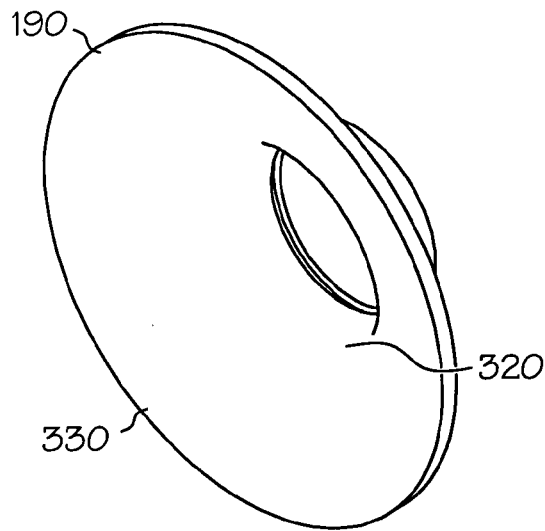
FIG. 10 is a pictorial view of an exhaust bellmouth of the present invention.

As illustrated in FIG. 10, the exhaust bellmouth 190, which may be constructed of a high temperature capable material, such as a nickel based alloy or titanium, can be secured at the aft end 102 of the enclosure 100. If required by a particular application, the exhaust bellmouth 190 and the enclosure 100 can be thermally isolated from one another by means of an insulator sandwiched in the joint. As seen in FIG. 2, extending radially inward from the enclosure 100, and longitudinally opposite the turbomachine air intake duct 150, may be a one-quarter toroidal surface 320 whose axis of revolution can be coincident with the centerline (not shown) of the turbomachine 16. The toroidal surface convex face 330 may be directed inward. The exhaust bellmouth terminating diameter 340 may be slightly larger than that of the exhaust nozzle 290 on the turbomachine 16 and incorporates a bellmouth flange 195. One example of a suitable bellmouth flange 195 may be the AS1895 compliant flange capable of interfacing with a standard V-retainer coupling, as disclosed in Society of Automotive Engineers Aerospace Standard AS1895.

Figure 11:
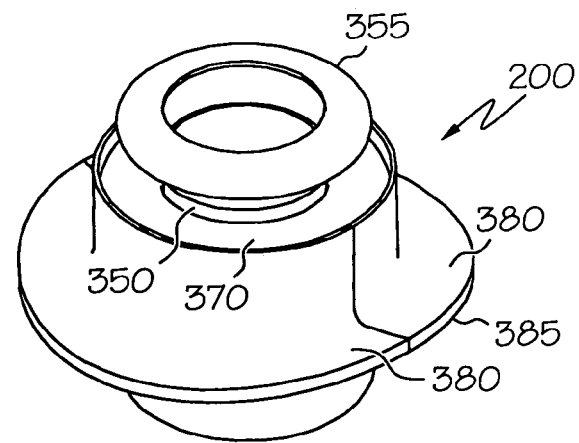
FIG. 11 is a pictorial view of a bleed port of the present invention.

The bleed port 200, which is shown in FIG. 11, may provide a fireproof penetration through the enclosure 100 to allow aircraft pneumatic ducting (not shown) to be connected to the turbomachine's bleed air supply. A stub duct 350 diameter may match that of the turbomachine's bleed air takeoff duct 360 (FIG. 2), and can extend radially outward therefrom and penetrate the bleed port aperture 300 of the enclosure 100. The diameter of the bleed port aperture 300 in the enclosure 100 may be sized to provide adequate clearance for a stub duct flange 355 that may be attached to each axial end of the stub duct 350. Attached to the circumference of the stub duct 350, inboard of the enclosure penetration, may be a fireproof compressible seal 370. In one exemplary embodiment, the fireproof compressible seal may be constructed of a glass fiber fabric woven about polycrystalline fibers. Two cover plates 380 may interface with the outer surface of the enclosure 100 and the compressible seal 370 on the stub duct 350. When installed, the cover plates 380 may form a bleed port 390 whose centerline (not shown) may be coincident with the centerline (not shown) of the stub duct 350 and whose inside diameter compresses the fireproof compressible seal 370 to prevent flame propagation through the joint. The cover plates 380 may extend radially outward from the interface with the fireproof compressible seal 370 to a point proximate the outer surface of the enclosure 100. A bleed port-enclosure flange 385 contoured to the outer surface of the enclosure may be integrally formed with the cover plates 380. Secondarily bonded to the outer surface of this bleed port-enclosure flange 385 may be an annulus (not shown) whose inside diameter may be only slightly larger than the outside diameter of the stub duct 350, thereby further restricting flame propagation. A gasket may be installed between the cover plates 380 and the enclosure 100. In one exemplary embodiment of the present invention, the turbomachine air intake duct 150, the enclosure 100, and the bleed port 390 may be secured to the turbomachine 16 to form the APU with integral firebox 10, which forms a removable unit. The APU with integral firebox 10 may be retrofitted onto aircraft, and removed from an aircraft.

Several other systems may be included with the APU with integral firebox 10. In further exemplary embodiments, other systems used with the present invention may include: a wiring harness system (not shown). The wiring harness system can consist of a short wiring harness terminated on one end with an industry standard connector, which may interface with the turbomachine electrical connector, and terminated on the opposite end with an industry standard bulkhead connector (not shown) on the enclosure 100. The electrical power distribution can consist of two short insulated power cables 400 (FIG. 1) terminated on one end with industry standard lugs (not shown), and on the opposite end with industry standard bulkhead connectors (not shown) on the enclosure 100. The fuel supply (not shown) can consist of an industry standard bulkhead connector mounted on the enclosure 100 and a TSO-C53a compliant fuel hose (not shown), which may connect the turbomachine fuel port (not shown) to the bulkhead connector (not shown).

In a further exemplary embodiment of the APU with an integral firebox 10, fiber reinforced plastic composites such as glass/epoxy; graphite/phenolic, etc. may be used in lieu of GR/BMI. (It should be noted that GR/BMI may have the advantage over other fiber matrix combinations in that it provides the best compromise between fireproof characteristics, weight, and cost.) In yet a further exemplary embodiment of the integral APU with an integral firebox 10 of the present invention, the turbomachine air intake duct 150 may be bonded to the mount system 70 in lieu of using fasteners (not shown).

It should be understood, of course, that the foregoing relates to exemplary embodiments of the invention and that modifications may be made without departing from the spirit and scope of the invention as set forth in the following claims.

We claim:

1. An auxiliary power unit and integral firebox, comprising: a turbomachine; a fireproof air intake duct at least partially surrounding the turbomachine, a turbomachine air intake duct having an aft end; a fireproof enclosure having an intake portion and surrounding the turbomachine; a fireproof mounting portion adapted to coupling the aft end of the turbomachine air intake duct to the intake portion of the fireproof enclosure, the coupling comprising a fireproof sealant disposed between the fireproof mounting portion and the air intake duct, the fireproof mounting portion further adapted to couple the air intake duct and the fireproof enclosure to the turbomachine, wherein the coupling between the air intake duct and the fireproof enclosure comprises a plurality of fireproof joint; and a bleed port having an inlet end connected to a turbomachine bleed air supply, said bleed port extending from said inlet end through said fireproof enclosure to an outlet, wherein said bleed port further comprises a stub duct extending radially from a turbomachine bleed air takeoff duct to penetrate a bleed port aperture of said fireproof enclosure, said bleed port having a fireproof compressible seal disposed to said stub duct inboard of said fireproof enclosure.

2. The auxiliary power unit and integral firebox of claim 1, further comprising a mounting system to mount the auxiliary power unit and integral firebox to an aircraft.

3. The auxiliary power unit and integral firebox of claim 2, further comprising a fireproof sealant disposed between said mounting system and said turbomachine air intake duct.

4. The auxiliary power unit and integral firebox of claim 1 wherein said turbomachine air intake duct is formed into a single fiber reinforced plastic composite.

5. The auxiliary power unit and integral firebox of claim 1 wherein said fireproof compressible seal may be constructed of a glass fiber fabric woven about polycrystalline fibers.

6. The auxiliary power unit and integral firebox of claim 1 further comprising at least two cover plates to mate with one another and form a cylinder and interface with an outer surface of said enclosure and said fireproof compressible seal.

7. The auxiliary power unit and integral firebox of claim 1 wherein said fireproof enclosure has an inner surface to provide a structural backing capable of securing a thermal barrier.

8. The auxiliary power unit and integral firebox of claim 7 wherein said thermal baffler is constructed of a powder-filament mixture of amorphous silica, metal oxides, and glass filaments.

9. An auxiliary power unit, comprising: a turbomachine; a fireproof turbomachine air intake duct having an aft end, the fireproof turbomachine air intake duct surrounding the turbomachine; a firebox secured to the fireproof turbomachine air intake duct, the firebox comprising: a fireproof enclosure surrounding the turbomachine and coupled to the aft end of said fireproof turbomachine air intake duct via a fireproof mounting portion, said fireproof mounting portion additionally coupling to the turbomachine, wherein the coupling between the fireproof mounting portion and the fireproof turbomachine air intake duct comprises a plurality of fireproof joints and a fireproof sealant is disposed therebetween; and a bleed port having an inlet end connected to a turbomachine bleed air supply, said bleed port extending from said inlet end through said fireproof enclosure to an outlet, wherein said bleed port further comprises a stub duct extending radially from a turbomachine bleed air takeoff duct to penetrate a bleed port aperture of said fireproof enclosure, said bleed port having a fireproof compressible seal disposed to said stub duct inboard of said fireproof enclosure.

10. The auxiliary power unit of claim 9, further comprising a mounting system configured for mounting the auxiliary power unit and firebox to an aircraft.

11. The auxiliary power unit of claim 9, further comprising an air intake duct flexible boot that is secured to an intake end.

12. The auxiliary power unit of claim 9 further comprising:
an air intake flame arrestor secured within said fireproof turbomachine air intake duct and disposed between a staffer-generator unit and an intake end.

13. The auxiliary power unit of claim 9 further comprising:
a cooling air intake duct extending forwardly from said fireproof enclosure.

* * * * *

UNITED STATES PATENT AND TRADEMARK OFFICE
CERTIFICATE OF CORRECTION

PATENT NO.         : 7,526,921 B2                                           Page 1 of 1
APPLICATION NO.    : 11/225556
DATED              : May 5, 2009
INVENTOR(S)        : Williams et al.

It is certified that error appears in the above-identified patent and that said Letters Patent is hereby corrected as shown below:

Column 7, line 50, "joint" should be changed to --joints--;
Column 8, line 22, "baffler" should be changed to --barrier--;
Column 8, line 36, "ioints" should be changed to --joints--;
Column 8, line 53, "staffer" should be changed to --starter--.

Signed and Sealed this

First Day of September, 2009

David J. Kappos
*Director of the United States Patent and Trademark Office*